United States Patent
Schnell et al.

(10) Patent No.: US 6,803,405 B1
(45) Date of Patent: Oct. 12, 2004

(54) THICKENERS FOR AQUEOUS DISPERSIONS

(75) Inventors: Klaus Schnell, Neustadt (DE); Michael Kerber, Weinheim (DE); Eberhard Schupp, Grünstadt (DE); Eckehardt Wistuba, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 279 days.

(21) Appl. No.: 10/088,521
(22) PCT Filed: Oct. 10, 2000
(86) PCT No.: PCT/EP00/09921
§ 371 (c)(1), (2), (4) Date: Mar. 29, 2002
(87) PCT Pub. No.: WO01/29100
PCT Pub. Date: Apr. 26, 2001

(30) Foreign Application Priority Data

Oct. 19, 1999 (DE) .......................... 199 50 229

(51) Int. Cl.$^7$ ................................. C08L 31/04
(52) U.S. Cl. ................. 524/524; 524/515; 524/516; 526/264; 526/330
(58) Field of Search .................. 524/515, 516, 524/524; 526/264, 330

(56) References Cited

U.S. PATENT DOCUMENTS

| 2,667,473 A | | 1/1954 | Morner | |
|---|---|---|---|---|
| 3,166,525 A | | 1/1965 | Perry | |
| 3,531,451 A | * | 9/1970 | Lederer et al. | 526/264 |
| 3,632,542 A | * | 1/1972 | Fox et al. | 524/563 |
| 4,255,310 A | * | 3/1981 | Oppenlaender et al. | 524/109 |

FOREIGN PATENT DOCUMENTS

| DE | 2 224 129 | 1/1973 |
|---|---|---|
| EP | 0 688 799 | 12/1995 |

OTHER PUBLICATIONS

Von H. Fikentscher: "Systematik der Cellulosen auf Grund ihrer Viskositat in Losung" pp. 58–63, Nov. 12, 1931.

* cited by examiner

Primary Examiner—Helen L. Pezzuto
(74) Attorney, Agent, or Firm—Oblon, Spivak, McClelland, Maier & Neustadt, P.C.

(57) ABSTRACT

The invention relates to the aqueous preparation of a polymer. Said preparation contains a copolymer consisting of a) 30 to 79.5 wt. % N-vinylpyrrolidone, b) 20 to 69.5 wt. % vinylacetate, c) 0.5 to 25 wt % of a monovinyl ester of a $C_4$ to $C_{20}$ monocarboxylic acid and d) 0 to 40 wt. % of an additional, copolymerisable, ethylenically unsaturated compound.

9 Claims, No Drawings

THICKENERS FOR AQUEOUS DISPERSIONS

The invention relates to an addition copolymer of
a) from 30 to 79.5% by weight of N-vinylpyrrolidone
b) from 20 to 69.5% by weight of vinyl acetate
c) from 0.5 to 25% by weight of a monovinyl ester of a $C_4$ to $C_{20}$ monocarboxylic acid
d) from 0 to 40% by weight of a further, copolymerizable, ethylenically unsaturated compound,
the percentages by weight in each case being based on the said copolymer.

The invention further relates to the use of the above copolymer as a thickener for aqueous polymer dispersions.

Aqueous polymer dispersions are used as binders for environment-friendly adhesives, paints, impregnating compositions or other coating compositions. Depending on the intended use, the polymer dispersions may include further additives; examples that may be mentioned include fillers, pigments, pigment dispersants, film formers (plasticizers, solvents, resins), defoamers, wetting agents and, in particular, thickeners.

The addition of thickeners establishes the desired viscosity and rheology.

The thickeners are therefore of great importance for processing properties such as flow behavior and brushability. The properties of the coatings obtained after drying, however, should not be adversely affected by the thickener. In particular, thickeners should not result in a reduction in water resistance or in impaired adhesion in the case of adhesives.

Customary organic thickeners, such as hydroxyethylcellulose, polyvinyl alcohol and polyacrylic acid (acrylate thickeners), for example, often do adversely affect the water resistance and the adhesion spectrum.

Inorganic thickeners, an example being bentonite, ultimately act like a filler. In the case of adhesives, they lead to reduced adhesion and, in general, bring about clouding of the resultant coating.

Thickeners based on N-vinylpyrrolidone are among those already known.

The use of N-vinylpyrrolidone copolymers is described, for example, in DE-A-2224129.

Known, for example, are commercially customary thickeners based on copolymers of N-vinylpyrrolidone and vinylpropionate (Collacral®, BASF).

The activity of these thickeners is often still not sufficient; it is desired that the amount of thickener required be reduced further. In particular, the thickener should be equally effective in the acidic, neutral and alkaline pH range.

It is an object of the present invention to provide, for aqueous polymer dispersions, thickeners which possess a high level of activity, i.e., are effective even in small amounts, and which do not exhibit the above disadvantages, or do so only to a minor extent.

We have found that this object is achieved by means of the addition copolymer defined at the outset. We have also found that the copolymer can be used as a thickener for aqueous polymer dispersions.

An addition copolymer consists of
a) from 30 to 79.5% by weight, preferably from 35 to 74.5% by weight, with particular preference from 50 to 69% by weight, of N-vinylpyrrolidone,
b) from 20 to 69.5% by weight, preferably from 25 to 64.5% by weight, with particular preference from 30 to 49% by weight, of vinyl acetate,
c) from 0.5 to 25% by weight, preferably from 0.5 to 15% by weight, with particular preference from 1 to 10% by weight, of a monovinyl ester of a $C_4$ to $C_{20}$ monocarboxylic acid, and
d) from 0 to 40% by weight, preferably from 0 to 30% by weight, with particular preference from 0 to 15% by weight, of a further, copolymerizable, ethylenically unsaturated compound.

The percentages by weight are based on the copolymer.

Monomers c) preferably comprise a monovinyl ester of a branched monocarboxylic acid, i.e., of a monocarboxylic acid having at least one tertiary or quaternary carbon atom. Tertiary carbon atoms have three adjacent carbon atoms and one hydrogen atom. Quaternary carbon atoms have four adjacent carbon atoms and no hydrogen atoms.

The monocarboxylic acids preferably have a tertiary or quaternary carbon atom; with particular preference, the tertiary or quaternary carbon atom is attached directly to the carboxyl group (COOH).

The monocarboxylic acid has preferably from 5 to 15 carbon atoms, more preferably from 8 to 12 carbon atoms and, in particular, 9 or 10 carbon atoms. With particular preference, the monocarboxylic acid has a quaternary carbon atom attached directly to the carboxyl group.

Monocarboxylic acids of this kind are known in the form of Versatic acids® (Shell).

Examples that may be mentioned include 2,2-dimethylolpropionic acid, 2,2-dimethylbutyric acid, 2-ethylbutyric acid, and 2-methylbutyric acid.

The respective monovinyl ester of the monocarboxylic acid is obtainable by esterification using vinyl alcohol.

Further monomers, d), can be, for example, alkyl acrylates or other vinyl esters. The use of further monomers is not necessary in order to obtain the desired activity as thickeners.

The addition copolymer can be obtained by free-radical polymerization of the compounds a) to d).

Particularly suitable is solution polymerization in water or in a mixture of water and organic solvent.

The copolymer is preferably in the form of a solution or dispersion in water, the amount of the copolymer being, for example, from 5 to 70% by weight, preferably from 20 to 60% by weight, based on the solution or dispersion (water+copolymer).

The copolymer is preferably used in the form of the aqueous solution or dispersion.

The copolymer preferably has a K value of from 30 to 100. The K value according to Fikentscher (Cellulose-Chemie 13, 1932, pages 58–64) is a measure of the molecular weight and is measured on a 1% solution of the copolymer in water (23° C.).

The copolymer is suitable as a thickener for aqueous dispersions of polymers. These can be, for example, free-radically polymerized polymers, polyesters, or polyurethanes.

Within the aqueous dispersion, the polymers are present in the form of dispersed particles. The dispersed particles can be stabilized by emulsifiers or protective colloids; alternatively, the polymers may be self-dispersing as a result of the incorporation of hydrophilic groups.

Aqueous dispersions of free-radically polymerized polymers can be obtained readily by emulsion polymerization.

Aqueous dispersions of free-radically polymerized polymers, polyurethanes and polyesters can also be obtained, for example, by solution polymerization in an organic solvent and subsequent dispersion of the polymer in water.

In the case of the free-radically polymerized polymers, preferred polymers are those which are composed to the extent of more than 50% by weight of principal monomers selected from $C_1$ to $C_{18}$ alkyl (meth)acrylates, vinyl esters of $C_1$ to $C_{20}$ carboxylic acids, vinylaromatic compounds having up to 20 carbon atoms, vinyl halides, nonaromatic hydrocarbons having one or two conjugated double bonds, or mixtures of these monomers.

For use as a thickener, the copolymer of the monomers a) to d) can be added in the desired amount to the polymer dispersions. Suitable amounts are from 0.2 to 20 parts by weight, with particular preference from 0.5 to 5 parts by weight and, with very particular preference, from 0.7 to 2.5 parts by weight of copolymer per 100 parts by weight of the polymer.

Depending on the intended use, the aqueous polymer dispersion may include further additives in addition to the thickener, examples being dyes, fillers, pigments, film formers, defoamers, etc. Possible uses include adhesives, coating compositions, paints, or impregnating compositions. Within the aqueous dispersions the addition copolymer acts as a thickener without impairing the performance properties when the dispersion is used. In particular, the transparency of coatings, and the adhesion in the case of use as an adhesive, is not adversely affected.

EXAMPLE
Preparing a Thickener

| Initial charge: | |
|---|---|
| 113.42 ml | of feed stream 1 |
| 10.89 ml | of feed stream 3 |
| 14.79 g | of isopropanol |
| Feed stream 1: | |
| 311.93 g | of N-vinylpyrrolidone |
| 329.63 g | of vinyl acetate |
| 26.73 g | of VeoVa 9 (vinyl ester of Versatic acid) |
| 45.44 g | of isopropanol |
| 269.55 g | of deionized water |
| Feed stream 2: | |
| 222.6 g | of N-vinylpyrrolidone |
| Feed stream 3: | |
| 42.74 g | of isopropanol |
| 2.27 g | of 2,2'-azobis(methylbutyronitrile) |
| Feed stream 4: | |
| 642.08 g | of deionized water |
| 0.38 g | of hydrogen peroxide, 50% strength |
| Feed stream 5 | |
| 1225.63 g | of deionized water |

The initial charge is placed in a pressure vessel at 0.5 bar and heated to about 70° C.

Feed stream 2 and the remainder of feed stream 1 are mixed (feed stream mixture).

The feed stream mixture is metered in over 4 hours and feed stream 3 is commenced simultaneously and metered in over 3.5 hours. After the end of feed stream 3, feed stream 4 is metered in over 0.5 hour.

After the end of feed stream 3, the temperature is held at about 72° C. for a total of 2 hours more. Then feed stream 5 is added and the organic solvent is distilled off.

A solids content of 30% by weight is established using water. The K value of the resulting copolymer was 56; the viscosity of a 20% strength by weight solution at 23° C. in accordance with DIN 53211 is 77 sec.

The viscosity is 3100 mPas (23° C.) at a shear rate of 250 $s^{-1}$ (DIN EN ISO 3219). The pH is 4.3.

Comparative Example

The comparative example was conducted in accordance with the inventive example.

The composition of feed stream 1, however, was as follows:

| | |
|---|---|
| 311.93 g | of N-vinylpyrrolidone |
| 356.36 g | of vinyl acetate |
| 45.44 g | of isopropanol |
| 269.55 g | of deionized water |

A solids content of 30% by weight is established using water. The K value of the copolymer is 63. The viscosity of a 20% strength by weight solution at 23° C. in accordance with DIN 53211 is 55 s.

The viscosity of a 30% strength by weight solution is 2500 mPas at a shear rate of 250 $s^{-1}$ (23° C.).

TABLE 1

Composition of the thickeners in % by weight

| | Inventive example | Comparative example |
|---|---|---|
| N-Vinylpyrrolidone | 60 | 60 |
| Vinyl acetate | 37 | 40 |
| Veova 9* | 3 | — |

*Vinyl ester of Versatic acid having 9 carbon atoms (CAS Number 54423-67-5)

II. Testing as Thickeners in Aqueous Polymer Dispersions

1% by weight of the 30% thickener from the inventive or comparative example, respectively, was mixed with 99% by weight of the commercial dispersion Acronal V 210 (69% acrylate dispersion) or Luphen D 200 A (40% polyurethane dispersion) at 23° C. with stirring. After 24 hours, the viscosity of the thickened and unthickened samples was measured.

TABLE 2

Comparison of the viscosity of the plain dispersion and of the thickened dispersion with the thickener from the inventive example and comparative example

| Sample | Viscosity in mPas at a shear rate of 250 $s^{-1}$ and 23° C. |
|---|---|
| Acronal V 210 without thickener | 250 |
| Acronal V 210 with 1% of thickener from the inventive example | 2200 |
| Acronal v 210 with 1% of thickener from the comparative example | 400 |
| Luphen D 200 A | 55 |
| Luphen D 200 A with 1% of thickener from the inventive example | 180 |
| Luphen D 200 A with 1% of thickener from the comparative example | 60 |

We claim:
1. A process comprising
mixing an addition copolymer and an aqueous polymer dispersion to thicken said aqueous dispersion,
wherein said addition polymer is composed of a) from 30 to 79.5% by weight of N-vinylpyrrolidone, b) from 20 to 69.5% by weight of vinyl acetate, c) from 0.5 to 10% by weight of a monovinyl ester of a $C_4$ to $C_{20}$ monocarboxylic acid, and d) from 0 to 40% by weight of a further, copolymerizable, ethylenically unsaturated compound, and the percentages by weight in each case based on the weight of said copolymer.

2. The process as claimed in claim 1, wherein c) is a monovinyl ester of a branched monocarboxylic acid having at least one tertiary or quaternary carbon atom.

3. The process as claimed in claim 1, wherein c) is a monovinyl ester of a $C_5$ to $C_{15}$ monocarboxylic acid.

4. The process as claimed in claim 1, wherein c) is a monovinyl ester of a Versatic acid.

5. An aqueous polymer dispersion comprising a thickener, wherein said thickener is an addition copolymer composed of a) from 30 to 79.5% by weight of N-vinylpyrrolidone, b) from 20 to 69.5% by weight of vinyl acetate, c) from 0.5 to 10% by weight of a monovinyl ester of a C4 to C20 monocarboxylic acid, and d) from 0 to 40% by weight of a further, copolymerizable, ethylenically unsaturated compound, and the percentages by weight in each case based on the weight of said copolymer.

6. The aqueous dispersion as claimed in claim 5, which further comprises a dispersion of a free-radically polymerized polymer, a polyester or a polyurethane.

7. The aqueous dispersion as claimed in claim 6, wherein the free-radically polymerized polymer is a polymer composed of not more than 50% by weight of one or more principal monomers selected from the group consisting of $C_1$ to $C_{18}$ alkyl (meth)acrylates, vinyl esters of $C_1$ to $C_{20}$ carboxylic acids, vinylaromatic compounds having up to 20 carbon atoms, vinyl halides, nonaromatic hydrocarbons having one or two conjugated double bonds and mixtures thereof.

8. The aqueous polymer dispersion as claimed in claim 5, containing from 0.2 to 20 parts by weight of the addition copolymer per 100 parts by weight of a dispersed polymer.

9. An addition copolymer composed of a) from 30 to 79.5% by weight of N-vinylpyrrolidone b) from 20 to 69.5% by weight of vinyl acetate c) from 0.5 to 10% by weight of a monovinyl ester of a branched $C_4$ to $C_{20}$ monocarboxylic acid having at least one tertiary or quaternary carbon atom d) from 0 to 40% by weight of a further, copolymerizable, ethylenically unsaturated compound, the percentage by weight in each case being based on the said copolymer.

* * * * *